United States Patent
Butcher et al.

(10) Patent No.: US 9,710,341 B2
(45) Date of Patent: Jul. 18, 2017

(54) FAULT TOLERANT LINK WIDTH MAXIMIZATION IN A DATA BUS

(71) Applicant: Dell Products, L.P., Round Rock, TX (US)

(72) Inventors: Wade Andrew Butcher, Cedar Park, TX (US); Hendrich M. Hernandez, Round Rock, TX (US); Timothy M. Lambert, Austin, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 297 days.

(21) Appl. No.: 14/571,297

(22) Filed: Dec. 16, 2014

(65) Prior Publication Data
US 2016/0170918 A1    Jun. 16, 2016

(51) Int. Cl.
G06F 11/20 (2006.01)
G06F 13/16 (2006.01)
G06F 13/40 (2006.01)
H04L 12/24 (2006.01)
H04L 12/40 (2006.01)

(52) U.S. Cl.
CPC ...... *G06F 11/2002* (2013.01); *G06F 13/1678* (2013.01); *G06F 13/405* (2013.01); *G06F 13/4018* (2013.01); *G06F 13/4022* (2013.01); *G06F 13/4072* (2013.01); *H04L 12/2422* (2013.01); *H04L 12/40182* (2013.01)

(58) Field of Classification Search
CPC ............ G06F 11/2002; H04L 12/2422; H04L 12/40182
USPC .......................................................... 714/4.5
See application file for complete search history.

(56) References Cited

U.S. PATENT DOCUMENTS

| | | | | |
|---|---|---|---|---|
| 8,463,952 B1* | 6/2013 | Tracht | ................. | G06F 11/2007 710/14 |
| 9,201,741 B2* | 12/2015 | Nishita | ............... | G06F 11/1625 |
| 2008/0005706 A1* | 1/2008 | Sharma | ............... | G06F 11/0745 716/136 |
| 2012/0144230 A1* | 6/2012 | Buckland | ............ | G06F 13/4022 714/4.5 |
| 2013/0103975 A1* | 4/2013 | Tan | ........................ | G06F 11/202 714/4.2 |
| 2013/0326286 A1* | 12/2013 | Nagano | ............... | G06F 11/0751 714/48 |
| 2015/0278040 A1* | 10/2015 | Sikkink | ............... | G06F 11/2002 714/5.1 |

* cited by examiner

*Primary Examiner* — Glenn A Auve
(74) *Attorney, Agent, or Firm* — Norton Rose Fulbright US LLP (57) ABSTRACT

Embodiments of systems and methods for fault tolerant link width maximization in a data bus are described. Embodiments of methods may include checking a data bus connection to determine if a degraded lane exists on the data bus, determining a first set of one or more lanes that contain the degraded lane, and assigning a second set of lanes for operation, wherein the second set of lanes does not contain the degraded lane.

20 Claims, 7 Drawing Sheets

FAULT TOLERANT LINK WIDTH MAXIMIZATION IN A DATA BUS

FIELD

This disclosure relates generally to information handling systems, and more specifically, to fault tolerant link width maximization in a data bus.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Components of information handling systems are often connected with data busses, such as Peripheral component Interconnection (PCI), PCI Express (PCIe), etc. A common data bus configuration includes sets of wire conductors arranged as differential pairs, each pair being commonly referred to as a "lane." Lanes can be degraded during an initial training or setup sequence of operations, or during operation of the information handling system. Lane degradation can occur as a result of errors in the training process, bent connector pins or damaged connector contacts, shorts in the wire conductors, or the like.

In prior systems, a data bus may still be able to operate in a reduced width mode, where all conductors up to the degraded lane are used, but all lanes after the degraded lane are unused. In such systems, several of the unused lanes may be individually operable, but are unused because the bus controller is unable to utilize the unused lanes. Therefore, prior systems wasted potentially usable bandwidth on a data bus with one or more degraded lanes.

SUMMARY

Embodiments of systems and methods for fault tolerant link width maximization in a data bus are described. Embodiments of methods may include checking a data bus connection to determine if a degraded lane exists on the data bus, determining a first set of one or more lanes that contain the degraded lane, and assigning a second set of lanes for operation, wherein the second set of lanes does not contain the degraded lane.

In an embodiment, checking the data bus connection includes communicating out of band with a data bus driver to determine whether any of the lanes are degraded. Also, in an embodiment, determining a first set of one or more lanes that contain the degraded lane may include bifurcating the data bus into a plurality of groups of lanes and checking connectivity of each group of lanes to determine whether each group has full connectivity. Such an embodiment may include further bifurcating the first set of one or more lanes to isolate a set of one or more degraded lanes. Alternatively, an embodiment may include further comprising bifurcating the lanes down to a fixed width smaller than the total bus width.

Some embodiments may include logically dividing the second set of lanes into a plurality of groups of lanes, and assigning the plurality of groups of lanes in logical connections to a plurality of hosts respectively. Also, some embodiments may include generating a log of the first set of lanes that contain the degraded lane.

An embodiment of a system may include a data bus having a plurality of lanes, each lane comprising a differential pair of conductors. Additionally, the system may include a data bus controller coupled to the data bus. In an embodiment, the data bus controller may check a data bus connection to determine if a degraded lane exists on the data bus, determine a first set of one or more lanes that contain the degraded lane, and assign a second set of lanes for operation, wherein the second set of lanes does not contain the degraded lane.

Embodiments of a tangible medium comprising machine executable instructions that, when executed by a machine, cause the machine to perform operations are described. In an embodiment, the operations may include checking a data bus connection to determine if a degraded lane exists on the data bus, determining a first set of one or more lanes that contain the degraded lane, and assigning a second set of lanes for operation, wherein the second set of lanes does not contain the degraded lane.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Embodiments of methods and systems for fault tolerant link width maximization in a data bus are described. The described embodiments may maximize link width in a data bus, even when certain lanes in the data link are unused. In particular, the embodiments may detect an inoperable or degraded lane in the data link, determine a set of usable lanes, and adjust the lane assignments to the maximum available width. In further embodiments, the degraded lanes may be logged. In still further embodiments, the available lanes may be logically merged into a single virtual data bus for maximum non-degraded performance. In still further embodiments, multiple hosts, such as compute nodes, may share a single end point device.

Beneficially, the described embodiments may yield improved bandwidth on data busses in an information handling system. The described embodiments may improve fault tolerance in an information handling system. Additionally, the described embodiments may enhance operability in a shared end point configuration.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
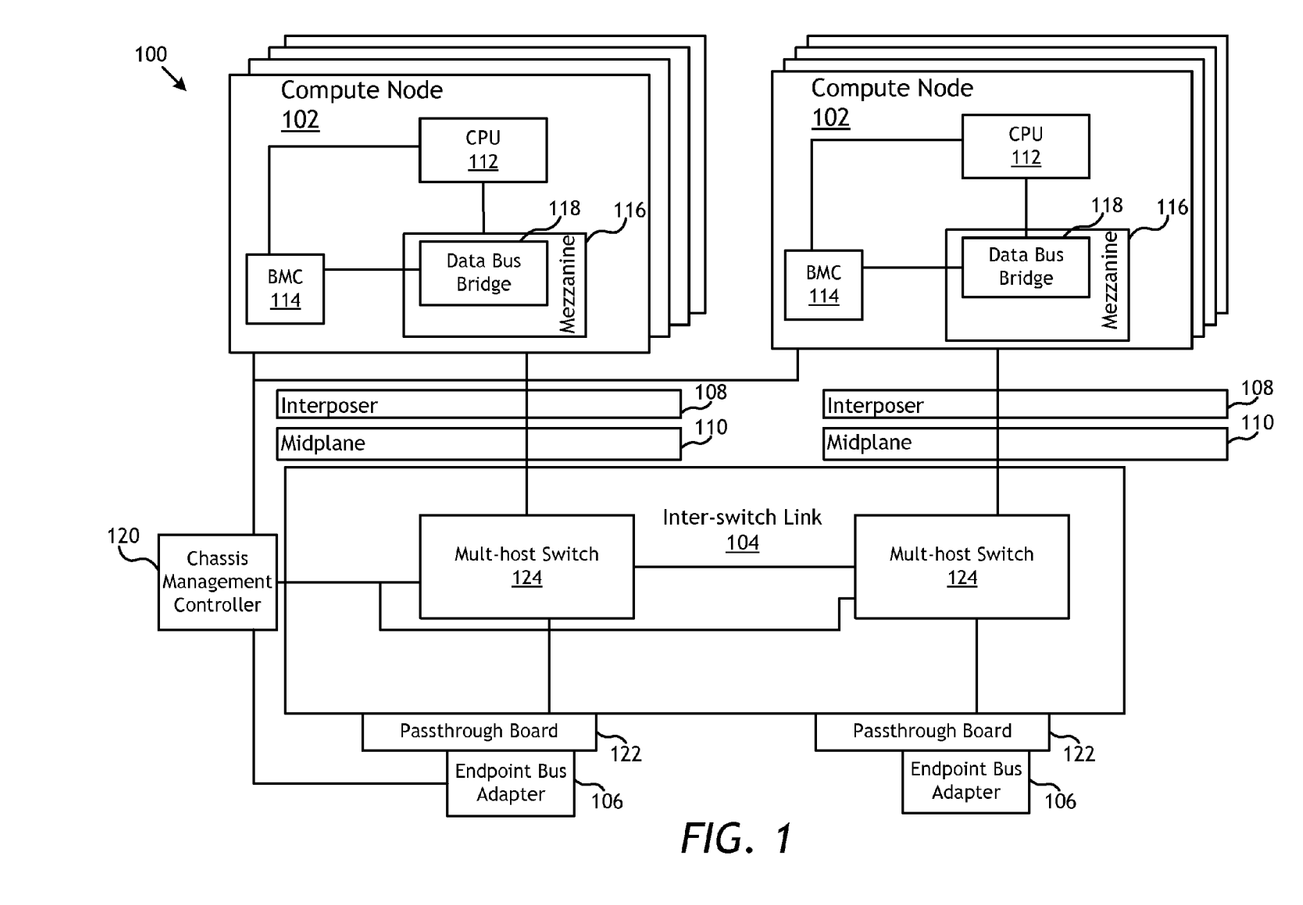
FIG. 1 is a schematic block diagram illustrating one embodiment of a system for fault tolerant link width maximization in a data bus.

FIG. 1 is a schematic block diagram illustrating one embodiment of a system 100 for fault tolerant link width maximization in a data bus. In an embodiment, the system 100 may include one or more compute nodes 102. Each compute node 102 may include a processor, such as CPU 112. In a particular embodiment, the CPU 112 may be a sled CPU with root complex. Each compute node 102 may further include a Baseboard Management Controller (BMC) 114.

The BMC 114 may communicate with the CPU 112 via a host interface connection. Additionally, the compute node 102 may include an Input/Output (I/O) mezzanine 116 card with a data bus bridge 118. In an embodiment, the data bus bridge 118 may be a PCIe bridge, or the like. The CPU 112 may communicate with the data bus bridge 118 via a PCIe bus, in some embodiments. The BMC 114 may communicate with the data bus bridge 118 via an I²C data link in some embodiments.

In an embodiment, the data bus bridge 118 may communicate with an end device via end point bus adapter 106. A data link, such as a PCIe data link, may be established via the interposer card 108, midplane card 110, and inter-switch link 104. In some embodiments, the inter-switch link 104 may include one or more multi-host switches 124. In some embodiments, the endpoint bus adapter 106 may connect to the multi-host switch 124 via a passthrough board 122. In a particular embodiment, the passthrough board 122 may be a PCIe passthrough board. The described embodiments may be particularly applied in the data links between the multi-host switch 124 and the endpoint bus adapter 106. In some embodiments, the data links may be eight (8) channel data links. In other embodiments, the data links may be sixteen (16) channel links or thirty-two channel links. One of ordinary skill may recognize alternative data link configurations. In some embodiments, a single endpoint may be assigned to a single compute node 102. In other embodiments, a single endpoint may be shared by multiple compute nodes 102. In such embodiments, lanes in the data link may be divided among the compute nodes 102 as described below with reference to FIG. 5

In a further embodiment, a chassis management controller 120 may communicate with the BMCs 114 and the multi-host switches 124 via a sideband link, such as an I²C or via an Ethernet management fabric.

Figure 2A:
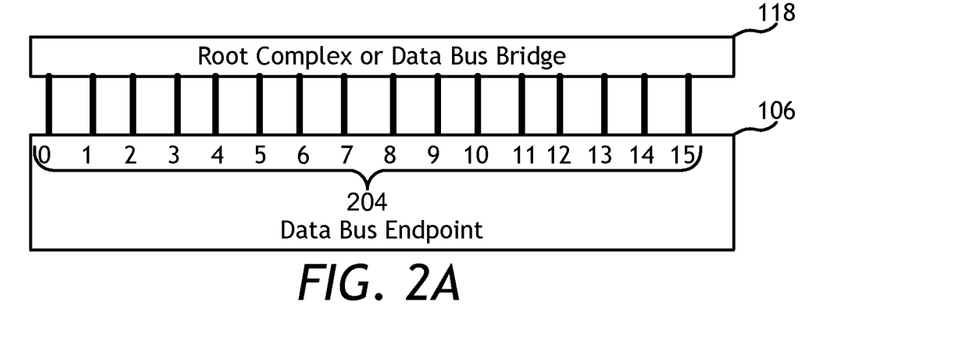
FIG. 2A is a schematic block diagram illustrating one embodiment of a data bus in an Information Handling System (IHS).

FIG. 2A is a schematic block diagram illustrating one embodiment of a data bus in an Information Handling System (IHS). In some embodiments, the data bus may be a PCIe data bus. One of ordinary skill will recognize other embodiments of data links with which the present embodiments may be utilized. In the embodiment of FIG. 2A, the data link includes sixteen (16) active lanes 204 connected between a data bus bridge 118 and an endpoint adapter 106.

Figure 2B:
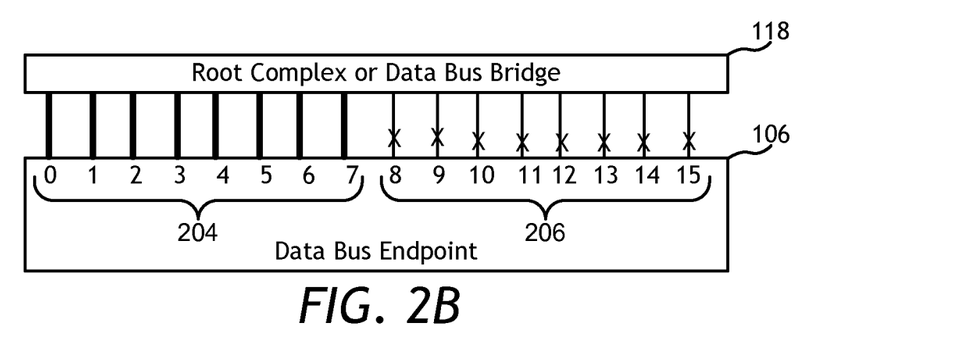
FIG. 2B is a schematic block diagram illustrating one embodiment of a data bus in an Information Handling System (IHS).
Figure 2C:
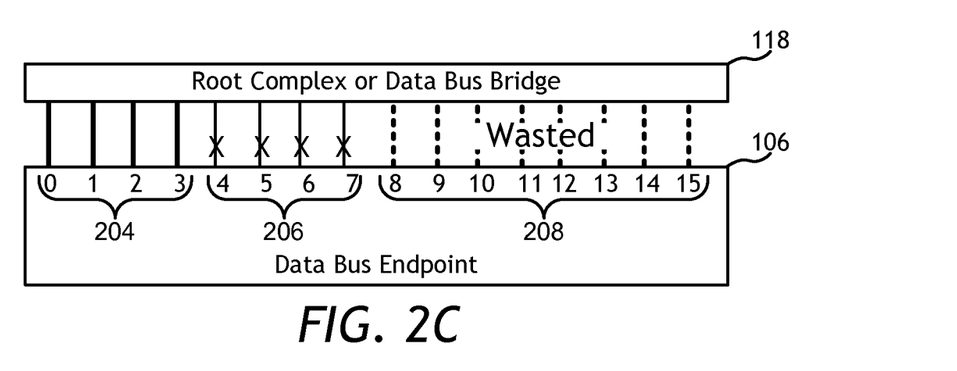
FIG. 2C is a schematic block diagram illustrating one embodiment of a data bus in an Information Handling System (IHS).
Figure 2D:
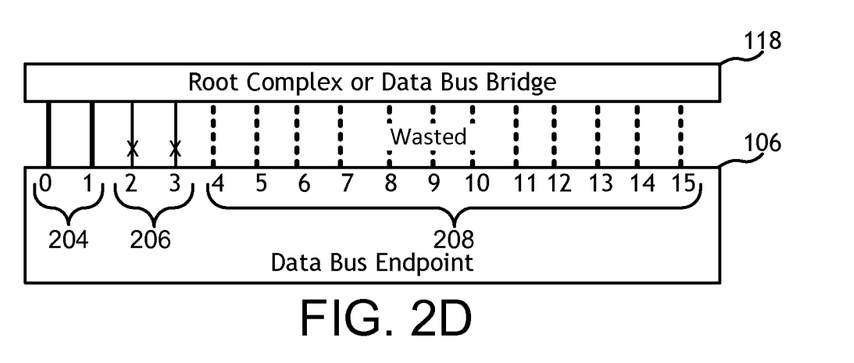
FIG. 2D is a schematic block diagram illustrating one embodiment of a data bus in an Information Handling System (IHS).
Figure 2E:
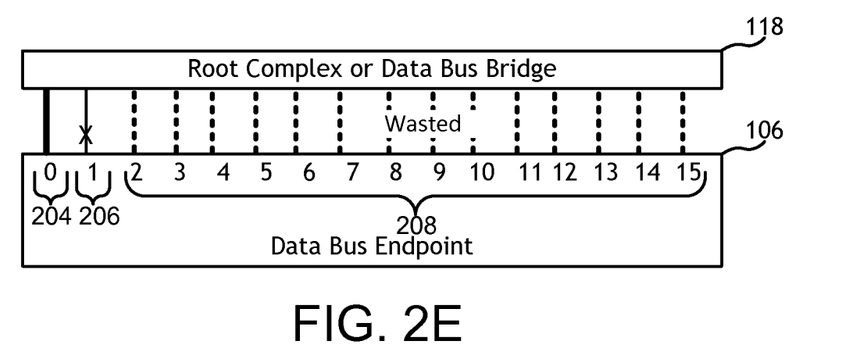
FIG. 2E is a schematic block diagram illustrating one embodiment of a data bus in an Information Handling System (IHS).

In FIG. 2B, lanes 0-7 may be active lanes 204 and lanes 8-15 may be degraded lanes 206. Active lanes 204 may be utilized for data communication between the compute nodes 102 and the endpoint devices. Degraded lanes 206 may not be used for data communications, and may be deactivated. FIG. 2C illustrates a situation in which lanes 4-7 are degraded lanes 206. In this situation, lanes 0-3 are active lanes and lanes 8-15 may be wasted, under prior configurations. The problem illustrated in FIG. 2C is that lanes 8-15 may be good lanes, but are unused in prior systems because they are essentially cut off by the degraded lanes 4-7. FIG. 2D further illustrates the problem of lane wasting. In FIG. 2D, only lanes 0-1 are active lanes 204. Lanes 2-3 are degraded lanes 206, and consequently lanes 4-15 are wasted lanes 208. FIG. 2E illustrates an extreme example of the problem where only lane 0 is an active lane 204, and lane 1 is a degraded lane 206, with lanes 2-15 being wasted lanes 208.

Figure 3:
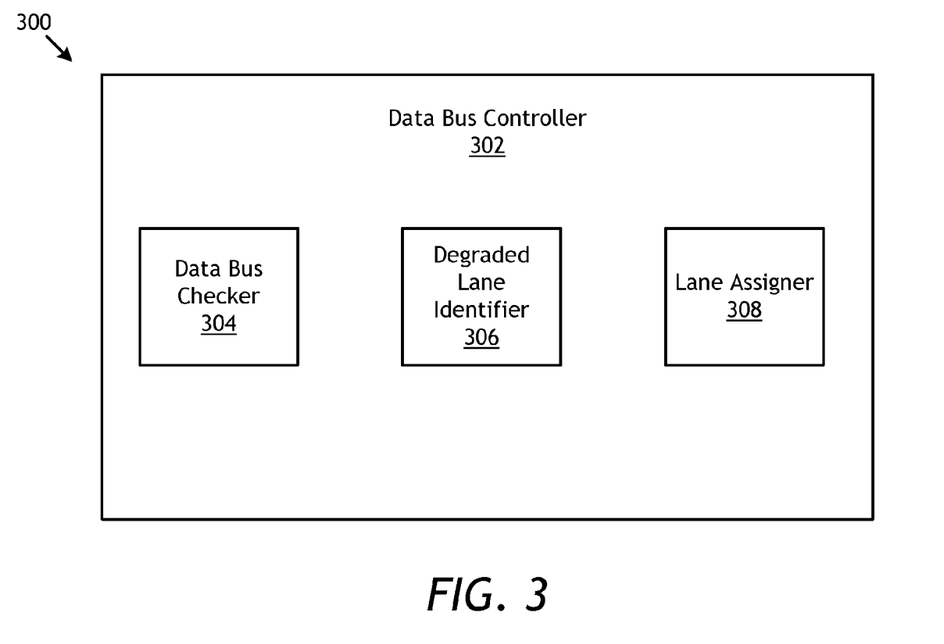
FIG. 3 is a schematic block diagram illustrating one embodiment of an apparatus for fault tolerant link width maximization in a data bus.

FIG. 3 is a schematic block diagram illustrating one embodiment of an apparatus 300 for fault tolerant link width maximization in a data bus. In an embodiment, the apparatus 300 may be a dedicated data bus controller. In another embodiment, the apparatus 300 may be a data bus controller component of a chassis management controller 120. In still another embodiment, the apparatus 300 may be a data bus controller component of a BMC 114. One of ordinary skill will recognize other embodiments of the apparatus 300, which may be suitable for use according to the present embodiments.

In an embodiment, the data bus controller 302 is configured to communicate with a data bus driver in a sideband connection, such as an I²C connection or a host connection. A data bus checker 304 may check the data bus connection to determine if a degraded lane exists on the data bus. For example, the data bus checker 304 may check the results of a data bus initialization or handshake process. In another embodiment, the data bus checker 304 may directly interrogate each lane to determine whether the lane is degraded prior to startup of the system or the data bus connection. One of ordinary skill may recognize alternative methods for checking the lanes data bus.

Once the data bus checker 304 determines that a degraded lane exists on the data bus, the degraded lane identifier 306 may determine a first set of one or more lanes that contain the degraded lane. In a further embodiment, the degraded lane identifier 306 may isolate the degraded lane. In some embodiments, the degraded lane identifier 306 may identify the first set or isolate the degraded lane by bifurcating the data bus in a binary fashion into smaller and smaller sets until the degraded lane is identified. In other embodiments, the degraded lane identifier 306 may perform only a single bifurcation, dividing the data bus into a top half and a bottom half. In other embodiments, the data bus may be bifurcated down to a resolution of four lanes. In still other embodiments, the data bus may be bifurcated into groups of two lanes or down to the single lane level. One of ordinary skill may recognize additional or alternative methods for identifying the degraded lane.

In an embodiment, the lane assigner 308 may assign the second set of lanes, which does not include the degraded lanes, for operation. In one embodiment, the lane assigner 308 may assign all of the available lanes between a single endpoint and a single host or compute node 102. In another embodiment, the second set of available lanes may be divided and assigned between multiple compute nodes as described below with reference to FIG. 5. In some embodiments, the second set of lanes may be a contiguous group of lanes. In another embodiment, the second set of lanes may include lanes from a first half of the data bus and lanes from the second half of the data bus, that are not contiguous, but do not include any degraded lanes.

Figure 4:
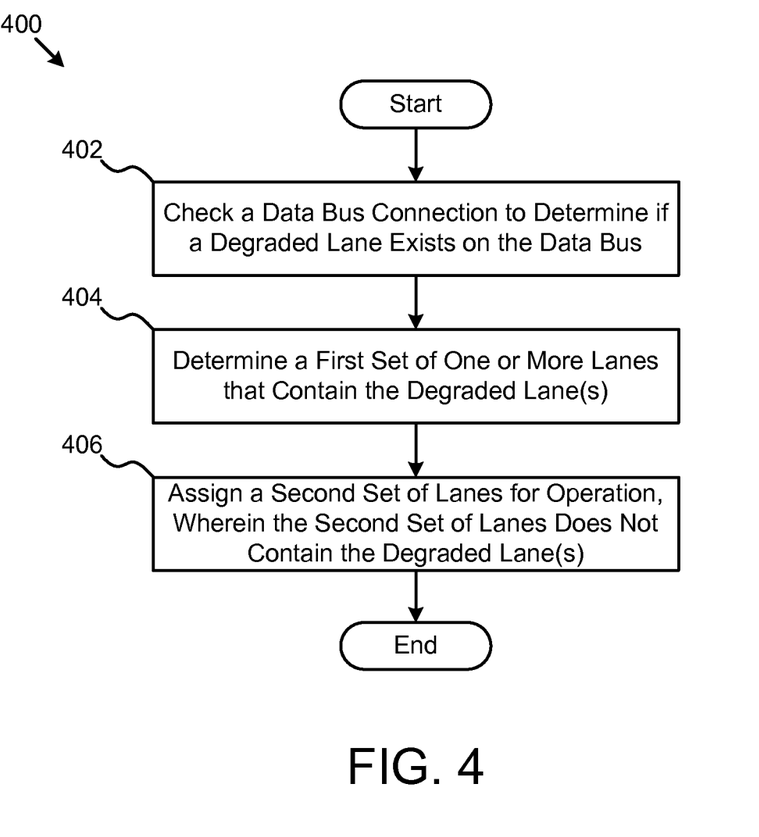
FIG. 4 is a schematic flowchart diagram illustrating one embodiment of a method for fault tolerant link width maximization in a data bus.

FIG. 4 is a schematic flowchart diagram illustrating one embodiment of a method 400 for fault tolerant link width maximization in a data bus. In an embodiment, the method 400 starts at block 402 with checking a data bus connection to determine if a degraded lane exists on the data bus. At block 404, the method may include determining a first set of one or more lanes that contain the degraded lane. Additionally, the method may include assigning a second set of lanes for operation, wherein the second set of lanes does not contain the degraded lane, as shown at block 406.

In further embodiments, checking the data bus connection at block 402 may include communicating out of band with a data bus driver to determine whether any of the lanes are degraded. In some embodiments, determining a first set of one or more lanes that contain the degraded lane as shown at block 404 may include bifurcating the data bus into a plurality of groups of lanes and checking connectivity of each group of lanes to determine whether each group has full connectivity. In such an embodiment, the method 400 may include bifurcating the first set of one or more lanes to isolate a set of one or more degraded lanes. Other embodiments of method 400 may include bifurcating the lanes down to a width of four lanes in a group. In an embodiment, assigning as shown at block 406 may include logically dividing the second set of lanes into a plurality of groups of lanes, and assigning the plurality of groups of lanes in logical connections to a plurality of hosts respectively. Further embodiments of the method 400 may include generating a log of the first set of lanes that contain the degraded lane.

Figure 5:
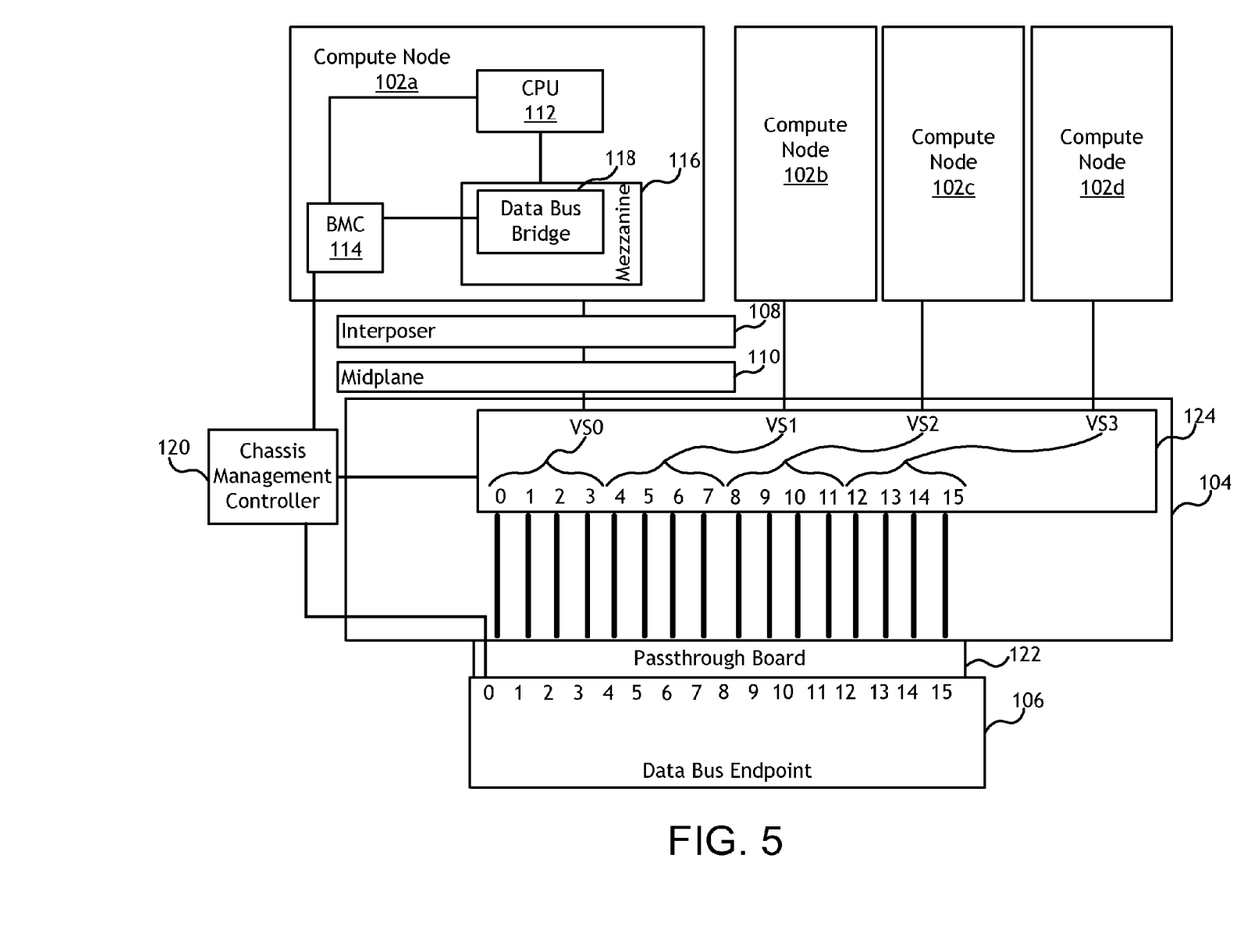
FIG. 5 is a schematic flowchart diagram illustrating another embodiment of a system for fault tolerant link width maximization in a data bus.

FIG. 5 is a schematic flowchart diagram illustrating another embodiment of a system 500 for fault tolerant link width maximization in a data bus. In an embodiment of FIG. 5, the lanes 202 of a single data bus may be virtually divided into multiple virtual data busses. For example, lanes 0-3 may be assigned to Virtual Switch (VS) 0 that is connected to a first compute node 102a, lanes 4-7 may be assigned to VS1 that is coupled to a second compute node 102b. Similarly, lanes 8-11 and 12-15 may be assigned to VS2 coupled to a third compute node 102c and VS3 coupled to a fourth compute node respectively.

As in FIG. 1, each compute node 102a-d in FIG. 5 may include a CPU 112, a BMC 114, a mezzanine 116, and a data bus bridge 118. Each compute node may connect to the multi-host switch 124 of the inter-switch link 104 via an interposer 108 and/or a midplane card 110. A chassis management controller 120 may communicate with the multi-host switch 124 and the BMC 114 of each compute node 102a-d. Each data bus endpoint 106 may communicate with the inter-switch link 104 via a passthrough board 122, in some embodiments.

In various embodiments, the data bus controller 302 may perform the various bifurcation changes and checks to both the PCIe upstream port of a given link (i.e., the bridge or root complex 118) and downstream port (i.e., an endpoint 106 or in some cases another downstream bridge's upstream port) in concert with each other. For example, in certain embodiments, the chassis management controller 120 may also communicate with the endpoint adapter 106 to communicate bus configuration information. For example, the chassis management controller 120 may communicate bus bifurcation instructions to the endpoint adapter 106. In such an embodiment, the endpoint adapter 106 may be logically synchronized with the data bus bridge 118 or root complex. In an embodiment, the chassis management controller 120 may communicate with the endpoint adapter via a sideband connection, such as I²C. Alternatively, the chassis management controller 120 may map the endpoint to the chassis management controller's PCIe hierarchy and communicate through the PCIe bus.

Figure 6:
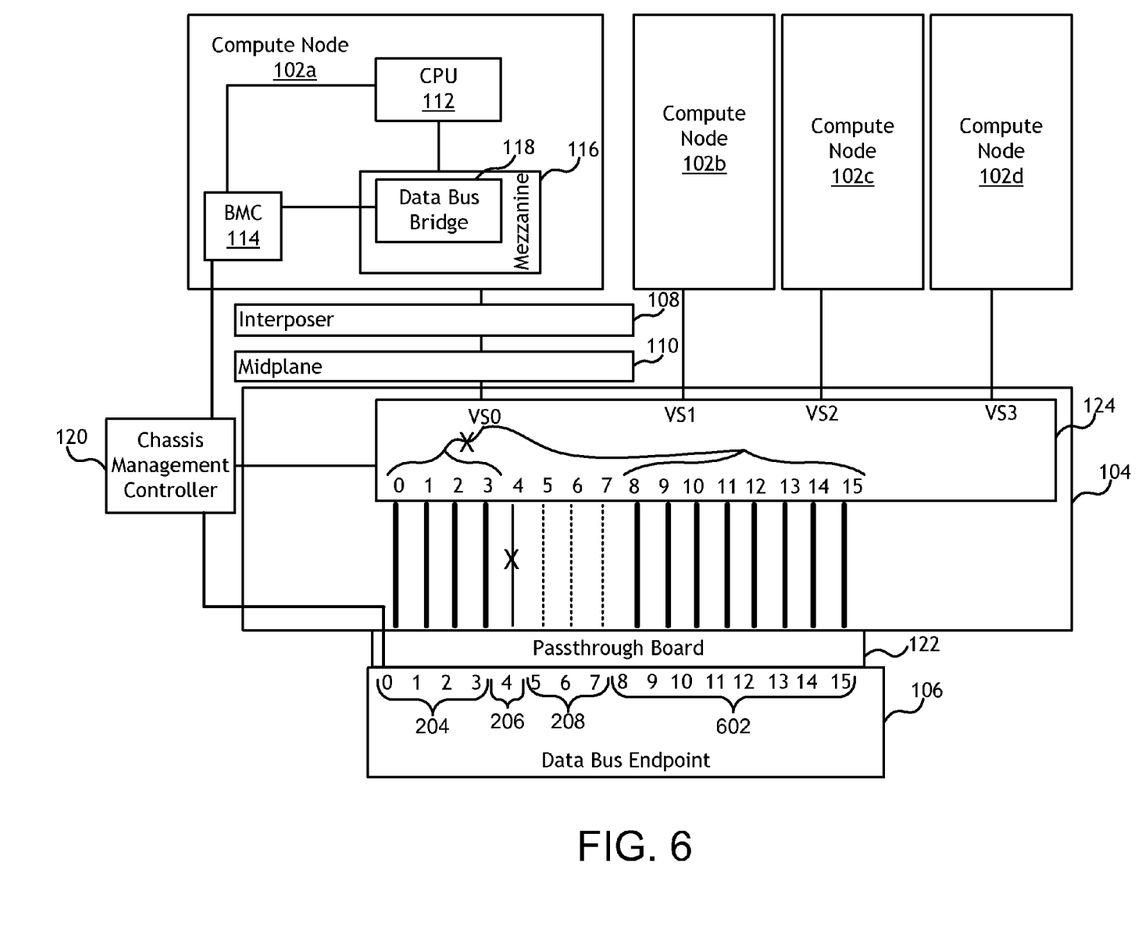
FIG. 6 is a schematic flowchart diagram illustrating another embodiment of a system for fault tolerant link width maximization in a data bus.

FIG. 6 is a schematic flowchart diagram illustrating another embodiment of a system 600 for fault tolerant link width maximization in a data bus. In the embodiment of FIG. 6, lanes 0-3 may be good lanes 204. Lane 4 may be a degraded lane 206. In one embodiment, the lanes may be bifurcated into a top 8 lanes and a bottom 8 lanes. In such an embodiment, lanes 8-15 may be bifurcated lanes 602, and may also be operable to communicate data.

If VS0 were originally coupled to the entire 16 lane bus, lanes 0-3 and lanes 8-15 may be available for communication. In one embodiment, VS0 may be coupled to lanes 0-3 for communication. In another embodiment, lanes 8-15 may be assigned to VS0. In still another embodiment, lanes 0-3 and lanes 8-15 may all be assigned to VS0 to maximize bandwidth. In some embodiments, lanes 5-8 may be wasted. In other embodiments, the bottom 8 lanes may be further bifurcated such that lanes 6-7 are also useable. In still further embodiments, the bottom 8 lanes may be further bifurcated such that lane 5 is also available for communication.

In alternative embodiments, lanes 0-3 may be assigned to VS0, lanes 8-11 may be assigned to VS2, and lanes 12-15 may be assigned to VS3. In such an embodiment, VS1 may not have connectivity. In a further embodiment, the bottom 8 lanes may be bifurcated to the point that lanes 6-7 may be assigned to VS1, etc.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically, and not necessarily electrically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method comprising:
   checking a data bus connection to determine if a degraded lane exists on the data bus;
   determining a first set of one or more lanes that contain the degraded lane;
   assigning a second set of lanes for operation, wherein the second set of lanes does not contain the degraded lane; and
   logically dividing the second set of lanes into a plurality of groups of lanes and assigning the plurality of groups of lanes in logical connections to a plurality of hosts respectively.

2. The method of claim 1, wherein checking the data bus connection includes communicating out of band with a data bus driver to determine whether any of the lanes are degraded.

3. The method of claim 1, wherein determining a first set of one or more lanes that contain the degraded lane comprises bifurcating the data bus into a plurality of groups of lanes and checking the connectivity of each group of lanes to determine whether each group has full connectivity.

4. The method of claim 3, further comprising further bifurcating the first set of one or more lanes to isolate a set of one or more degraded lanes.

5. The method of claim 3, further comprising bifurcating the lanes down to a fixed width smaller than the total bus width.

6. The method of claim 1, further comprising generating a log of the first set of lanes that contain the degraded lane.

7. The method of claim 1, further comprising synchronizing lane configurations at both endpoints of the data bus.

8. A system comprising:
   a data bus having a plurality of lanes, each lane comprising a differential pair of conductors; and
   a data bus controller coupled to the data bus, the data bus controller configured to:
   check a data bus connection to determine if a degraded lane exists on the data bus;
   determine a first set of one or more lanes that contain the degraded lane;
   assign a second set of lanes for operation, wherein the second set of lanes does not contain the degraded lane; and
   logically divide the second set of lanes into a plurality of groups of lanes, and assign the plurality of groups of lanes in logical connections to a plurality of hosts respectively.

9. The system of claim 8, wherein the data bus controller is configured to check the data bus connection by communicating out of band with a data bus driver to determine whether any of the lanes are degraded.

10. The system of claim 8, wherein the data bus controller is further configured to bifurcate the data bus into a plurality of groups of lanes and checking connectivity of each group of lanes to determine whether each group has full connectivity.

11. The system of claim 10, wherein the data bus controller is further configured to bifurcate the first set of one or more lanes to isolate a set of one or more degraded lanes.

12. The system of claim 10, wherein the data bus controller is further configured to bifurcate the lanes down to a fixed width smaller than the total bus width.

13. The system of claim 8, wherein the data bus controller is further configured to generate a log of the first set of lanes that contain the degraded lane.

14. The system of claim 8, wherein the data bus controller is further configured to synchronize lane configurations at both endpoints of the data bus.

15. A tangible non-transitory medium comprising machine executable instructions that, when executed by a machine, cause the machine to perform operations comprising:
   checking a data bus connection to determine if a degraded lane exists on the data bus;
   determining a first set of one or more lanes that contain the degraded lane;
   assigning a second set of lanes for operation, wherein the second set of lanes does not contain the degraded lane; and
   logically dividing the second set of lanes into a plurality of groups of lanes, and assigning the plurality of groups of lanes in logical connections to a plurality of hosts respectively.

16. The tangible medium of claim 15, wherein checking the data bus connection includes communicating out of band with a data bus driver to determine whether any of the lanes are degraded.

17. The tangible medium of claim 15, wherein the data bus controller is further configured to bifurcate the data bus into a plurality of groups of lanes and checking connectivity of each group of lanes to determine whether each group has full connectivity.

18. The tangible medium of claim 17, further comprising further bifurcating the first set of one or more lanes to isolate a set of one or more degraded lanes.

19. The tangible medium of claim 17, further comprising bifurcating the lanes down to a fixed width smaller than the total bus width.

20. The tangible medium of claim 15, further comprising generating a log of the first set of lanes that contain the degraded lane.

* * * * *